United States Patent [19]
Lawther

[11] Patent Number: 5,508,770
[45] Date of Patent: Apr. 16, 1996

[54] FILM TRANSPORT MECHANISM FOR CAMERA

[75] Inventor: Joel S. Lawther, Rochester, N.Y.

[73] Assignee: Eastman Kodak Company, Rochester, N.Y.

[21] Appl. No.: 368,463

[22] Filed: Jan. 4, 1995

[51] Int. Cl.⁶ .................................................. G03B 1/00
[52] U.S. Cl. ................................ 354/213; 354/214
[58] Field of Search ................................. 354/213, 214

[56] References Cited

U.S. PATENT DOCUMENTS

| | | | |
|---|---|---|---|
| 4,171,893 | 10/1979 | Kawazoe | 354/173 |
| 4,437,749 | 3/1984 | Ehgartner et al. | 354/214 |
| 4,540,261 | 9/1985 | Matsumoto et al. | 354/173.11 |
| 4,855,773 | 8/1989 | Harvey | 354/173.1 |

Primary Examiner—Monroe H. Hayes
Attorney, Agent, or Firm—Roger A. Fields

[57] ABSTRACT

A film transport mechanism for a camera comprises drive means for advancing a filmstrip beginning with a leading end portion from a film cartridge, and a perforation sensor for detecting a turn-around perforation in a trailing end portion of the filmstrip to initiate return of the filmstrip to the film cartridge. The perforation sensor is movable to a sensing position against the filmstrip to be able to drop into the turn-around perforation when the turn-around perforation is advanced to the perforation sensor. A film presence sensor is located to be actuated by a forward edge of the leading end portion of the filmstrip as the filmstrip is advanced from the film cartridge, to move the perforation sensor to its sensing position before the turn-around perforation can be advanced to the perforation sensor.

5 Claims, 4 Drawing Sheets

FILM TRANSPORT MECHANISM FOR CAMERA

CROSS-REFERENCE TO RELATED APPLICATION(S)

Reference is made to commonly assigned copending applications Ser. No. 08/368,688, entitled FILM TRANSPORT MECHANISM FOR CAMERA and filed Jan. 3, 1995 in the name of Joel S. Lawther, and Ser. No. 08/367,660, entitled FILM TRANSPORT MECHANISM FOR CAMERA and filed in Jan. 3, 1995 the name of Joel S. Lawther, each of which are assigned to the assignee of this application.

FIELD OF THE INVENTION

The invention relates generally to the field of photography, and in particular to a film transport mechanism for a camera. More specifically, the invention relates to a film transport mechanism capable of returning a filmstrip automatically to a film cartridge after the last exposure in a camera.

BACKGROUND OF THE INVENTION

Typically in some cameras the film transport mechanism is motorized. In operation, a leading end portion of the filmstrip protruding from a light-tight film cartridge loaded in the camera is attached automatically to a film take-up spool. The take-up spool is rotated after each exposure to advance successive frames of the filmstrip from the cartridge, across the focal plane of a taking lens, and onto the take-up spool. Each time the take-up spool is rotated, an unexposed frame of the filmstrip is positioned in the focal plane of the taking lens and an exposed frame is wound onto the take-up spool. When all of the available frames have been exposed, a trailing end portion of the filmstrip remains attached to a supply spool inside the cartridge. This end-of-film condition produces a sudden increase in the film tension and in the motor current as the take-up spool attempts to withdraw the remainder of the filmstrip from the cartridge. A tension sensing device responds to the increase in the film tension, or a current detecting circuit responds to the increase in the motor current, by reversing the motor drive to rotate the supply spool inside the cartridge. The rotated spool draws the exposed frames off the take-up spool and rewinds them into the cartridge.

Alternatively, in place of a tension sensing device or a current detecting circuit, a perforation sensor may provided for detecting a turn-around perforation in the trailing end portion of the filmstrip to initiate return of the filmstrip from the take-up spool to the cartridge.

SUMMARY OF THE INVENTION

A film transport mechanism for a camera comprising drive means for advancing a filmstrip beginning with a leading end portion from a film cartridge, and a perforation sensor for detecting a turn-around perforation in a trailing end portion of the filmstrip to initiate return of the filmstrip to the film cartridge, is characterized in that:

the perforation sensor is movable to a sensing position against the filmstrip to be able to drop into the turn-around perforation when the turn-around perforation is advanced to the perforation sensor; and film presence sensor means is located to sense a forward edge of the leading end portion of the filmstrip as the filmstrip is advanced from the film cartridge, for moving the perforation sensor to its sensing position before the turn-around perforation can be advanced to the perforation sensor.

DETAILED DESCRIPTION OF THE INVENTION

The invention is disclosed as being embodied preferably in a still-picture camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
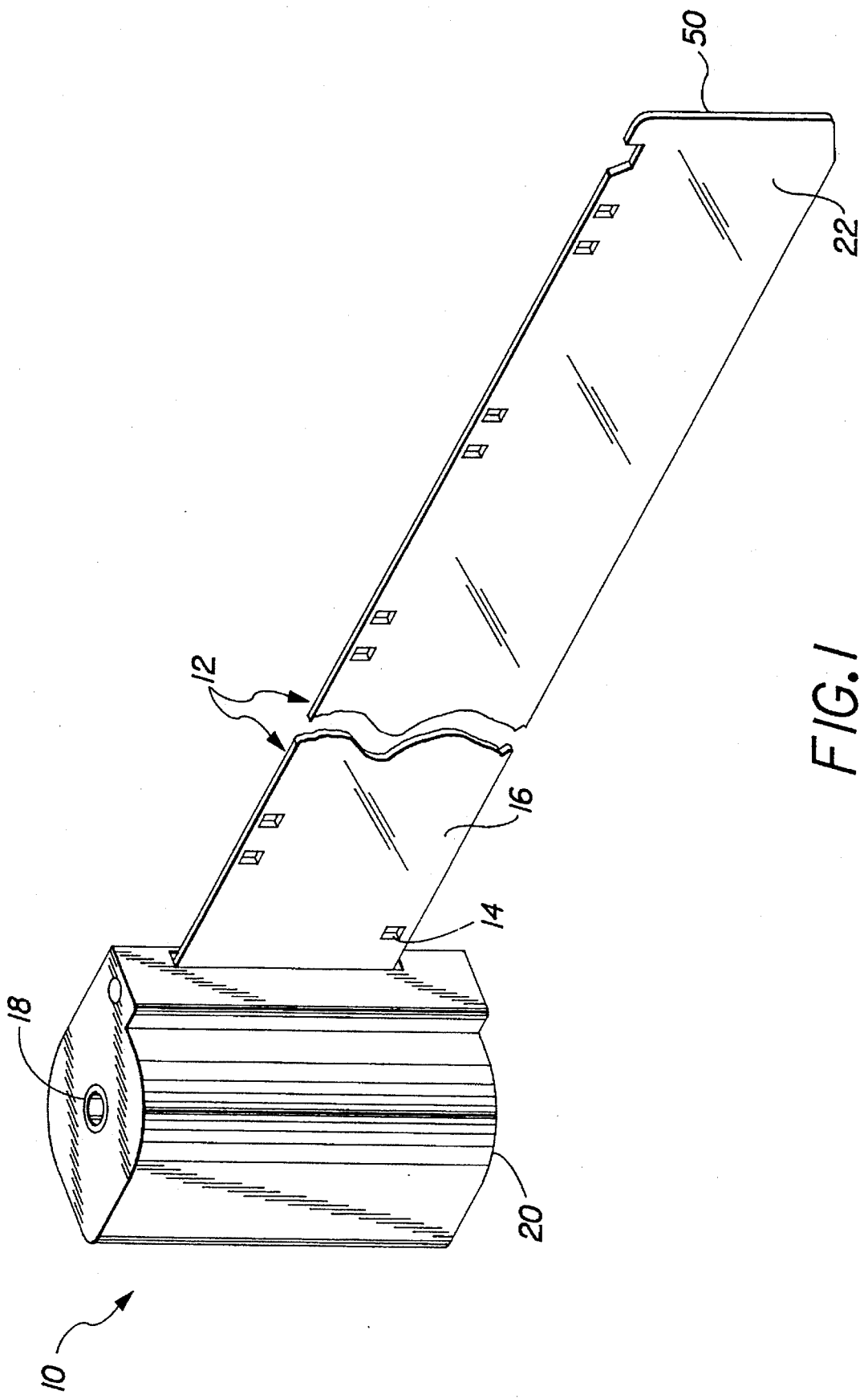
FIG. 1 is a perspective view of a film cartridge provided with a filmstrip having a turn-around perforation in a trailing end portion of the filmstrip.

Referring now to the drawings, FIG. 1 depicts a film cartridge 10 provided with a filmstrip 12 having a turn-around perforation 14 in a trailing end portion 16 of the filmstrip. The film cartridge 10 is similar to those disclosed in U.S. Pat. Nos. 5,305,504, issued Apr. 19, 1994, and 5,296,887, issued Mar. 22, 1994, in that unwinding rotation of a film supply spool 18 inside the cartridge housing 20 serves to advance or thrust the filmstrip 12 beginning with a leading end portion 22 from the cartridge interior.

Figure 2:
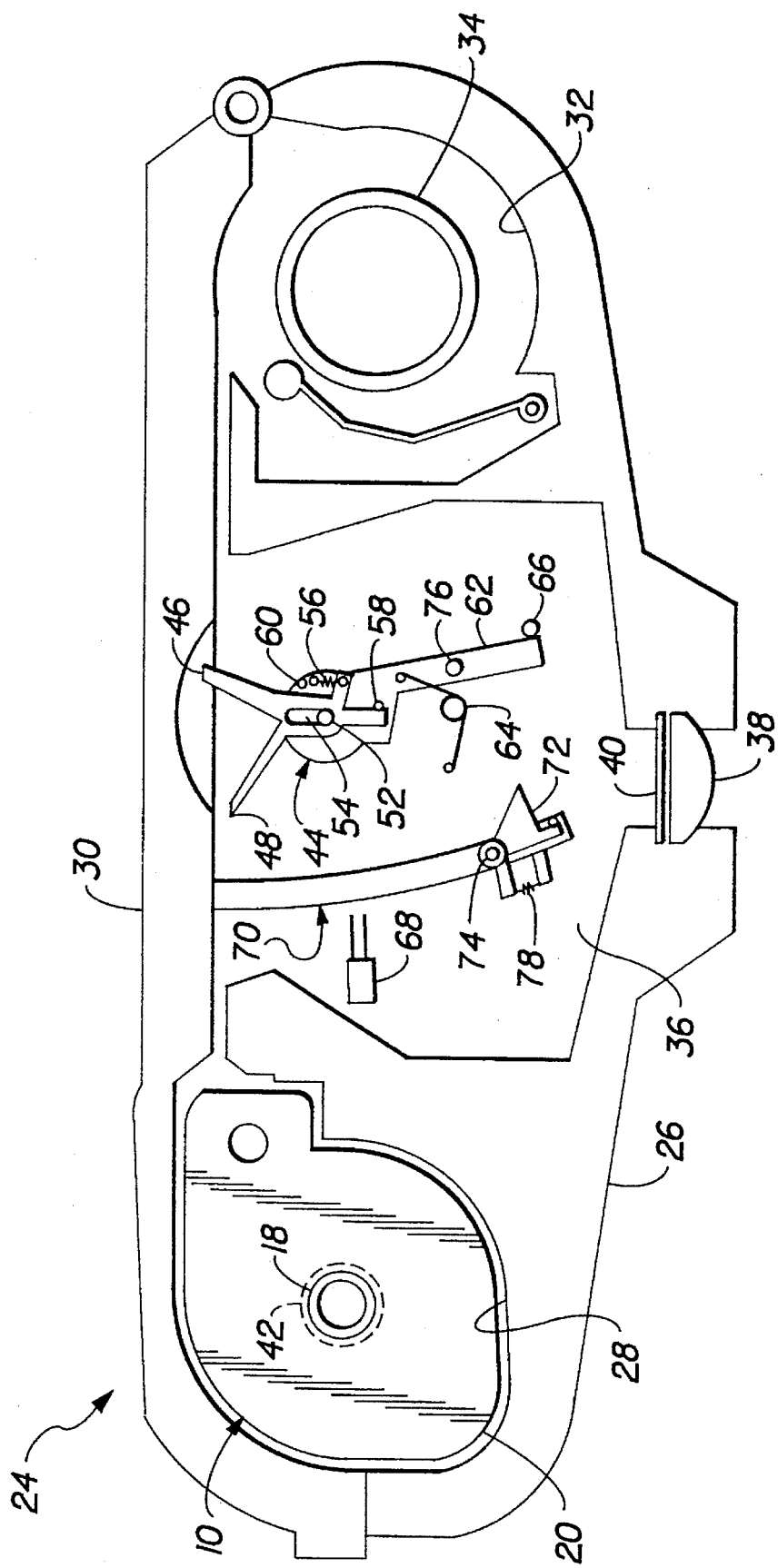
FIGS. 2–4 are schematic views of a camera provided with a film transport mechanism comprising a film take-up spool rotated to advance the filmstrip from the film cartridge onto a take-up spool, and a perforation sensor for detecting the turn-around perforation to initiate return of the filmstrip from the take-up spool to the film cartridge, which depict operation of the film transport mechanism.
Figure 3:
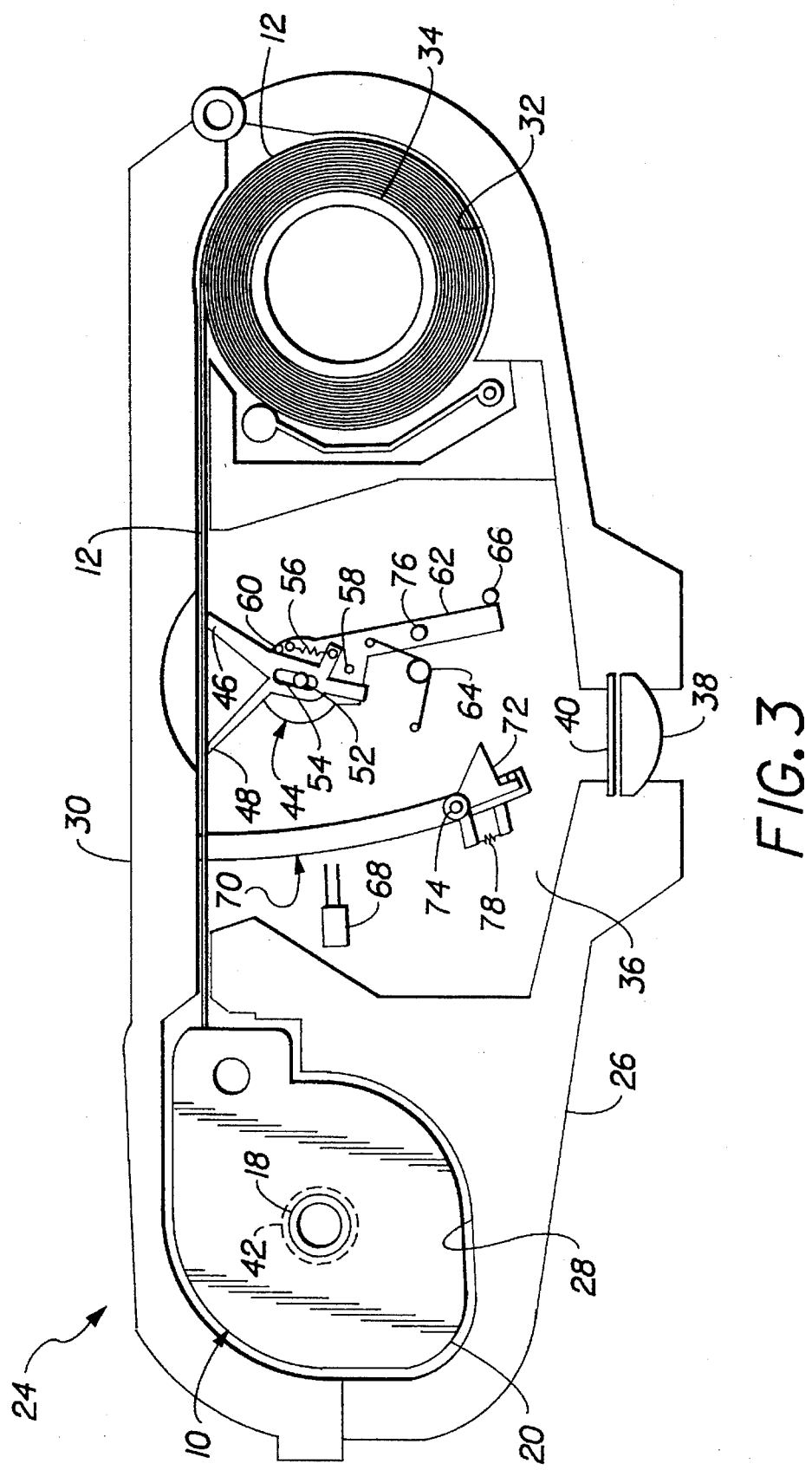
Figure 4:
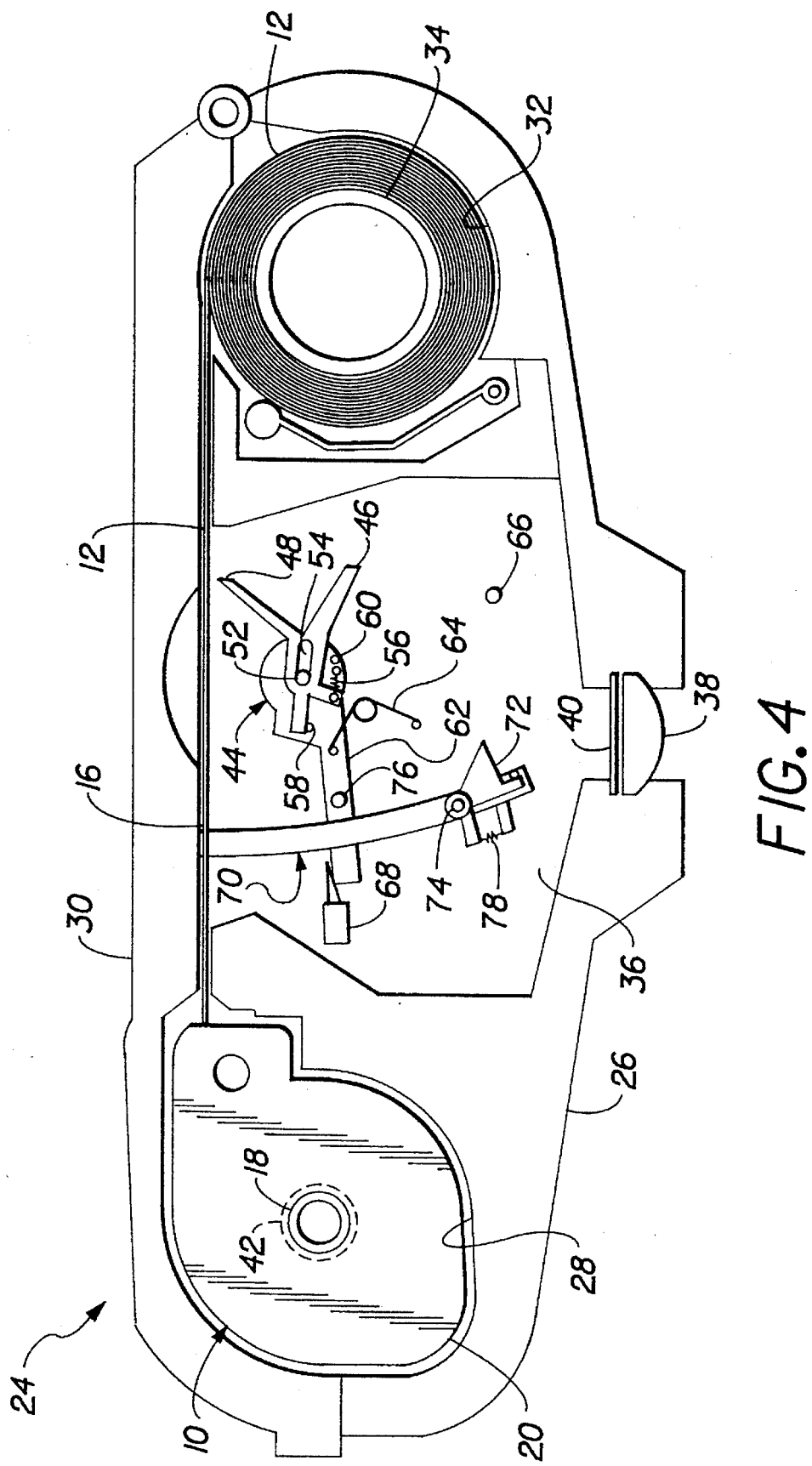

FIGS. 2–4 depict a still-picture camera 24 having a camera body 26. The camera body 26 as is disclosed in U.S. Pat. No. 4,855,773, issued Aug. 6, 1989, includes a loading chamber 28 for receiving the film cartridge 10 when a rear door 30 of the camera body is open, a take-up chamber 32 containing a rotatably supported film take-up spool 34, and a back frame opening 36 in which successive frames of the filmstrip are exposed via a taking lens 38 and a shutter 40. In operation, a rotation hub 42 which projects into the loading chamber 28 to engage the film supply spool 18 provides motor-driven unwinding rotation of the film supply spool to advance the filmstrip 12 beginning with its leading end portion 22 from the cartridge housing 20, across the back frame opening 36, and onto the take-up spool 34. Motor-driven unwinding rotation of the film supply spool 18 is then discontinued, and motor-driven winding rotation of the take-up spool 34 prewinds the filmstrip 12 except for its trailing end portion 16 onto the take-up spool before any exposures are made. During picture-taking, after each exposure is made, motor-driven winding rotation of the film supply spool 18 returns the exposed frame to the cartridge housing 20.

Alternatively, only the leading end portion 22 of the filmstrip 12 need be wound onto the take-up spool 34. Then, during picture-taking, after each exposure is made, motor-driven winding rotation of the take-up spool 34 winds the exposed frame onto the take-up spool. When the filmstrip 12 except for its trailing end portion 16 is exposed, motor-driven winding rotation of the film supply spool 18 returns the filmstrip to the cartridge housing 20.

A one-piece perforation/film presence sensor 44 includes an integral film presence sensing member 46 intended to be actuated by a forward edge 50 of the leading end portion 22 of the filmstrip as the filmstrip is advanced from the film cartridge 10, and an integral perforation sensing member 48 tapered to be able to drop into the turn-around perforation 14 in the trailing end portion 16 of the filmstrip when the turn-around perforation is advanced to the perforation sensing member. The sensor 44 has a ready or original position shown in FIG. 2, in which the film presence sensing member 46 is located to be in the way of the forward edge 50 of the leading end portion 22 of the filmstrip 12 and the perforation sensing member 48 is located to be out of the way of the forward edge. The sensor 44 is supported via a pivot pin 52 extending through a slot 54 in the sensor, which as shown in FIG. 2 permits a tension spring 56 to urge the sensor against a stop 58 and away from a stop 60. The stops 58 and 60 are fixed to a lever 62 supported on the pivot pin 52. A known type overcenter spring 64 either urges the lever 62 to pivot in a counter-clockwise direction as viewed in FIG. 2 to bias the lever against a stop 66 fixed to the camera body 26 or to pivot in a clockwise direction as viewed in FIG. 4 to bias the lever against a normally open switch 68 to close the switch. Closing the switch 68 initiates motor-driven winding rotation of the film supply spool 18 to return the exposed frame to the cartridge housing 20 after each exposure is made. FIG. 4 shows the sensor 44 in a retracted position, in which the perforation sensing member 48 is removed from the turn-around perforation 14 and the film presence sensing member 46 is separated from the filmstrip 12.

When the sensor 44 is in its ready position shown in FIG. 2, with the lever 62 biased via the overcenter spring 64 against the stop 66, and the forward edge 50 of the leading end portion 22 of the filmstrip 12 is advanced against the film presence sensing member 46, the sensor (but not the lever 62) is pivoted in a clockwise direction as viewed in FIG. 2 from its ready position until the perforation sensing member 48 is swung to a sensing position shown in FIG. 3. Consequently, the sensor 44 is moved from against the stop 58 to against the stop 60, the perforation sensing member 48 is biased via the tension spring 56 against the filmstrip 12 to be able to drop into the turn-around perforation 14, and the film presence sensing member 46 is moved out of the way of the filmstrip.

Then, when the perforation sensing member 48 is in its sensing position shown in FIG. 2, and the filmstrip 12 is advanced sufficiently to locate the turn-around perforation 14 opposite the perforation sensing member, the tension spring 56 urges the perforation sensing member to drop into the turn-around perforation. Further advance of the filmstrip 12 in engagement with the perforation sensing member 48 pivots the sensor 44 in a clockwise direction as viewed in FIG. 3. Since the sensor 44 is located against the stop 60 as shown in FIG. 3, the lever 62 is pivoted in the same direction from against the stop 66 to enable the overcenter spring 64 to pivot the lever to against the normally open switch 66 to close the switch. Consequently, the sensor 44 is pivoted to its retracted position shown in FIG. 4.

Finally, when the rear door 30 of the camera body 26 is opened, a resetting finger 70 projecting inwardly from the door is partially retracted from the camera body 26, and an actuator 72 mounted on the finger via a pivot pin 74 is pivoted beneath a stud 76 on the lever 62 contrary to the urging of a return spring 78. Conversely, when the door 30 is closed, the actuator 72 (rather than being pivoted beneath the stud 76) pushes against the stud to pivot the lever 62 in a counter-clockwise direction as viewed in FIG. 4 from against the switch 68 to enable the overcenter spring 64 to pivot the lever to against the stop 66. Consequently, the sensor 44 is returned from its retracted position shown in FIG. 4 to its ready position shown in FIG. 2.

The invention has been described with reference to a preferred embodiment. However, it will be appreciated that variations and modifications can be effected by a person of ordinary skill in the art without departing from the scope of the invention.

PARTS LIST 10. film cartridge
12. filmstrip
14. turn-around perforation
16. trailing end portion
18. film supply spool
20. cartridge housing
22. leading end portion
24. still-picture camera
26. camera body
28. loading chamber
30. rear door
32. take-up chamber
34. film take-up spool
36. back frame opening
38. taking lens
40. shutter
42. rotation hub
44. perforation/film presence sensor
46. film presence sensing member
48. perforation sensing member
50. forward edge
52. pivot pin
54. slot
56. tension spring
58. stop
60. stop
62. lever
64. overcenter spring
66. stop
68. switch
70. resetting finger
72. actuator
74. pivot pin
76. stud
78. return spring

I claim:

1. A film transport mechanism for a camera comprising drive means for advancing a filmstrip beginning with a leading end portion from a film cartridge, and a perforation sensor for detecting a turn-around perforation in a trailing end portion of the filmstrip to initiate return of the filmstrip to the film cartridge, is characterized in that:

said perforation sensor is movable to a sensing position against the filmstrip to be able to drop into the turn-around perforation when the turn-around perforation is advanced to the perforation sensor; and film presence sensor means is located to sense by a forward edge of the leading end portion of the filmstrip as the filmstrip is advanced from the film cartridge, for moving said perforation sensor to its sensing position before the turn-around perforation can be advanced to the perforation sensor.

2. A film transport mechanism for a camera comprising drive means for advancing a filmstrip beginning with a leading end portion from a film cartridge, and sensor means for detecting a turn-around perforation in a trailing end portion of the filmstrip to initiate return of the filmstrip to the film cartridge, is characterized in that:

said sensor means has a perforation sensing member adapted to fit in the turn-round perforation and a film presence sensing member located to be in the way of the forward edge of the filmstrip as the filmstrip is advanced from the film cartridge, and is a one-piece unit supported to be moved responsive to the forward edge of the filmstrip being advanced against said film presence sensing member to move said perforation sensing member simultaneously to a sensing position to be able to drop into the turn-around perforation when the turn-around perforation is advanced to the perforation sensing portion.

3. A film transport mechanism as recited in claim 2, wherein said sensor means is supported to be moved in a first direction to a ready position in which said perforation sensing member is located to be moved its sensing position and said film presence sensing member is located to be in the way of the forward edge of the filmstrip as the filmstrip is advanced from the film cartridge and to be moved in a reverse direction to a retracted position in which the perforation sensing member is removed from the turn-around perforation and the film presence sensing member is separated from the filmstrip, and an overcenter spring is connected to said sensor means to alternatively move the sensor means in the first and reverse directions to its ready and retracted positions.

4. A film transport mechanism as recited in claim 3, wherein said sensor means is supported to be moved in the reverse direction as the filmstrip is advanced with the perforation sensing member dropped into the turn-around perforation to enable said overcenter spring to move the sensing means in the same direction to its retracted position.

5. A film transport mechanism as recited in claim 4, wherein resetting means is actuated responsive to movement of a mechanical device to permit replacement of the film cartridge in the camera for moving said sensing means in the first direction from its retracted position to enable said overcenter spring to move the sensing means in the same direction to its ready position.

* * * * *